United States Patent
Saltsidis

(10) Patent No.: US 9,571,364 B2
(45) Date of Patent: Feb. 14, 2017

(54) CONNECTIVITY FAULT MANAGEMENT IN A COMMUNICATION NETWORK

(71) Applicant: TELEFONAKTIEBOLAGET L M ERICSSON (PUBL), Stockholm (SE)

(72) Inventor: Panagiotis Saltsidis, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 12 days.

(21) Appl. No.: 14/414,338

(22) PCT Filed: Jul. 12, 2013

(86) PCT No.: PCT/EP2013/064785
§ 371 (c)(1),
(2) Date: Jan. 12, 2015

(87) PCT Pub. No.: WO2014/009523
PCT Pub. Date: Jan. 16, 2014

(65) Prior Publication Data
US 2015/0229552 A1    Aug. 13, 2015

Related U.S. Application Data

(60) Provisional application No. 61/671,343, filed on Jul. 13, 2012.

(51) Int. Cl.
*H04L 12/24* (2006.01)
*H04L 12/26* (2006.01)
(Continued)

(52) U.S. Cl.
CPC ....... *H04L 43/0823* (2013.01); *H04L 12/4641* (2013.01); *H04L 41/0631* (2013.01);
(Continued)

(58) Field of Classification Search
None
See application file for complete search history.

(56) References Cited

U.S. PATENT DOCUMENTS 8,670,326 B1 *  3/2014  Balasubramanian ... H04L 45/22
                                                    370/238
2010/0157846 A1 *  6/2010  Cooper ................. H04L 41/145
                                                    370/254
(Continued)

FOREIGN PATENT DOCUMENTS

CN    101895409 A    11/2010
EP    1956766 A1    8/2008

OTHER PUBLICATIONS

IEEE Std. 802.1aq-2012; IEEE Standard for Local and metropolitan area networks—Media Access Control (MAC) Bridges and Virtual Bridged Local Area Networks—Amendment 20: Shortest Path Bridging; Jun. 29, 2012; New York, NY.
(Continued)

*Primary Examiner* — Duc Duong

(57) ABSTRACT

Methods and apparatus are disclosed for monitoring a Maintenance Association (MA) for Connectivity Fault Management (CFM) in a network supporting Equal Cost Multiple Paths (ECMP). A set of ECMP paths is generated for sending data between endpoints in the network. Furthermore, a set of ECMP MAs is created that are used for monitoring the generated ECMP paths between the endpoints. The created set of ECMP MAs is subsequently used for sending monitoring packets. ECMP path MAs therefore conform to existing CFM operation and are compatible with both ECMP point to point path MAs and ECMP multipoint path MAs.

13 Claims, 2 Drawing Sheets

(51) Int. Cl.
  *H04L 12/721* (2013.01)
  *H04L 12/46* (2006.01)
  *H04L 12/703* (2013.01)
  *H04L 12/707* (2013.01)
  *H04L 12/743* (2013.01)
  *H04L 12/70* (2013.01)

(52) U.S. Cl.
  CPC ...... *H04L 41/0866* (2013.01); *H04L 43/0811* (2013.01); *H04L 43/10* (2013.01); *H04L 45/12* (2013.01); *H04L 45/24* (2013.01); *H04L 45/28* (2013.01); *H04L 45/7453* (2013.01); *H04L 45/123* (2013.01); *H04L 2012/5625* (2013.01)

(56) References Cited

U.S. PATENT DOCUMENTS

| | | | | |
|---|---|---|---|---|
| 2011/0051602 A1* | 3/2011 | Matthews | ............... | H04L 45/00 370/235 |
| 2012/0106339 A1* | 5/2012 | Mishra | ................. | H04L 43/106 370/235 |
| 2012/0106358 A1* | 5/2012 | Mishra | ................ | H04L 43/0817 370/242 |
| 2012/0182865 A1* | 7/2012 | Andersen | ................. | H04L 1/22 370/228 |
| 2012/0218898 A1* | 8/2012 | Cai | .................... | H04L 12/1886 370/237 |

OTHER PUBLICATIONS

P802.1Qbp/D1.0, Local and Metropolitan Area Networks, 20.4 Connectivity Fault Management state machines, Jun. 20, 2012.

IEEE P802.1Qbp/D1.0, Draft Standard for Local and Metropolitan Area Networks—Virtual Bridged Local Area Networks—Amendment: Equal Cost Multiple Paths (ECMP); Jun. 20, 2012; Piscataway, NJ.

IEEE Std 802.1Q-2011 (Revision of IEEE Std 802.1Q-2005), IEEE Standard for Local and metropolitan area networks, Media Access Control (MAC) Bridges and Virtual Bridge Local Area Networks, Aug. 31, 2011, New York, NY.

IEEE Std 802.1Qay-2009 (Amendment to IEEE Std 802.1Q-2005) IEEE Standard for Local and metropolitan area networks, Virtual Bridged Local Area Networks, Amendment 10: Provider Backbone Bridge Traffic Engineering, Aug. 5, 2009, New York, NY.

* cited by examiner

CONNECTIVITY FAULT MANAGEMENT IN A COMMUNICATION NETWORK

This application is a 371 of PCT/EP2013/064785, filed Jul. 12, 2013, which claims the benefit of US Provisional Application No. 61/671,343, filed Jul. 13, 2012, the disclosures of which are fully incorporated herein by reference.

TECHNICAL FIELD

The invention relates to the field of Connectivity Fault Management in a communications network, in particular a network that supports Equal Cost Multiple Paths.

BACKGROUND

Operations, Administration and Maintenance (OAM) is a term used to describe processes, activities, tools, standards and so on that are involved with operating, administering, managing and maintaining a communication network. OAM requires fault management and performance monitoring, connectivity fault management and link layer discovery.

CFM is a protocol of OAM that provides Connectivity Fault Management (CFM). The CFM protocol uses Maintenance Domains (MD) for monitoring levels of service providers, core networks or system operators. Each level has Maintenance Associations (MA) dedicated to monitoring specific provider/provider or provider/customer service. Each MA depends on a set of Maintenance Points (MPs) for monitoring. An MA is established to verify the integrity of a single service instance. A Maintenance Association Edge Point (MEP) is an actively managed CFM entity which provides the extent of an MA and is associated with a specific port of a service instance. It can generate and receive CFM Protocol Data Units (PDUs) and track any responses. It is an end point of a single MA, and is an endpoint for each of the other MEPs in the same MA.

CFM PDUs are transmitted by a MEP in order to monitor the service to which the transmitting MEP belongs. A problem arises in Equal-Cost Multiple Paths routing (ECMP) networks where CFMs cannot be guaranteed to take the same path as the data.

ECMP routing is a forwarding mechanism for routing packets along multiple paths of equal cost. An aim of ECMP is to equalise distributed link load sharing. Referring to FIG. 1, there is illustrated schematically a very simple network architecture in which data sent between two endpoints 1, 2 can be sent via intermediate nodes 3 or 4 at equal cost.

Some data packets are sent via intermediate node 3 and others are sent via intermediate node 4. In this way the load on the network is balanced.

Shortest Path Bridging (SPB) enables the use of link state protocols (IS-IS) for constructing active topologies within a Bridged Network. For more information, see IEEE Std 802.1aq-2012, Shortest Path Bridging. Recent standardization work within IEEE802.1 enhances SPB by enabling ECMP support on SPBM services that use the same VID identifier, as described in P802.1Qbp/D1.0 Equal Cost Multiple Path (ECMP). P802.1Qbp discusses the services supporting ECMP connectivity and, in particular, defines two types of ECMP connectivity. One is associated with point-to-point (PtP) ECMP services provided by ECMP devices that support flow filtering. The other is a generic Virtual LAN (VLAN) service associated with a specific VLAN Identifier (VID) that is mapped to ECMP operation (SPBM VLAN MA in clause 27.18.1 in P802.1Qbp/D1.0 Equal Cost Multiple Path).

ECMP connectivity paths may use the same Bridging VLAN Identifier (B-VID) in their tags but the service connectivity provided by these paths are different than that associated with frames having the same B-VID and controlled by traditional L2 control protocols like spanning tree or SPB. A typical example of connectivity instances that use the same VID but are not members of a VLAN are Traffic Engineered Service Instances (TESIs) in Provider Backbone Bridges-Traffic Engineering (PBB-TE). ECMP connectivity is similar to that of TESIs but it has a further property that a superset of all ECMP paths identified by the same VID (and endpoints) is not a tree topology. A VLAN on the other hand is always defined in a context of a tree (see clause 7 in IEEE Std 802.1Q-2011, VLAN aware Bridges).

Shortest Path Bridging-MAC address mode (SPBM) connectivity is different to ECMP connectivity. SPBM connectivity is similar to that of PBB-TE (in that it there is no flooding, no learning, it is symmetric, and uses only explicit entries in a Filtering Database (FDB) for forwarding), which means in practice that CFM enhancements for PBB-TE (described in IEEE Std 802.1Qay-2009 PBB-TE and IEEE Std 802.1Q-2011, VLAN aware Bridges) can be used almost identically for SPBM MAs. Nevertheless, ECMP connectivity differs in that multiple paths are enabled for the same end points. The same VID and correspondingly the ECMP CFM require further changes in order to monitor the associated services. As a result ECMP MAs need to be separated from SPBM MAs, and the associated monitoring protocol tools need to be modified as their operation depends on the type of connectivity that they monitor.

ECMP Point-to-Point (PtP) path connectivity and the associated monitoring tools are described in P802.1Qbp, but P802.1Qbp does not describe ECMP multipoint monitoring in a consistent manner. In particular, the "SPBM VLAN" connectivity is associated with an overall connectivity identified by the same SPBM VID value. However, an overall SPBM-VID connectivity is meaningless for ECMP, because ECMP creates multiple independent connectivity paths between subsets of nodes that are members of the SPBM-VID. The operational status of each of the ECMP subsets is therefore independent of the operational status of the other ECMP subsets identified by the same SPBM-VID. This ECMP independency means that, when using SPBM OAM mechanisms and an overall SPBM-VID connectivity is reported as being error-free, the connectivity on ECMP subsets could be non-operational. The above connectivity characteristic of the SPBM VLAN Maintenance Association (MA) creates problems for monitoring multipoint ECMP services. In particular, since the SPBM VLAN Continuity Check protocol attempts to monitor the overall "VLAN" service, the scope of propagation of the Continuity Check Message (CCM) PDUs is provided by the use of a broadcast address (constructed using SPBM default Backbone Service Identifier, I-SID). The result of this is that monitored connectivity is different from the connectivity associated with the monitored data traffic. In addition, the operation of Link Trace Messages (LTM) becomes quite difficult and the extent of reachability of the LTMs can be quite different to that defined by the configured ECMP related MAC address entries.

Furthermore, the placement of the "SPBM VLAN MEP" in parallel to ECMP PtP path Maintenance Association Edge Points (MEPs) breaks the operation of the ECMP path MAs (stopping every ECMP Path CFM PDU on the SPBM-VID as can be seen from FIG. 27-4 in P802.1Qbp/D1.0.)

SUMMARY

It is an object to provide a mechanism by which Connectivity Fault Management Maintenance Associations can be monitored in an Equal Cost Multiple Paths network.

According to a first aspect, there is provided a method of monitoring a Maintenance Association (MA) for Connectivity Fault Management (CFM) in a network supporting Equal Cost Multiple Paths (ECMP). A set of ECMP paths is generated for sending data between endpoints in the network. Furthermore, a set of ECMP MAs is created that are used for monitoring the generated ECMP paths between the endpoints. The created set of ECMP MAs is subsequently used for sending monitoring packets. An advantage of this is that ECMP paths MAs conform to existing CFM operation and are compatible with both ECMP point to point path MAs and ECMP multipoint path MAs.

As an option, each monitoring packet comprises a CFM Protocol Data Unit. An advantage is that the forwarding parameters of the PDU are the same as those for monitored data packets sent using the ECMP paths, and so the monitoring packets will traverse the same path.

As an option, the method includes generating the set of ECMP paths using ECMP Point to Point paths, wherein the Point to Point paths comprising a set of equal shortest length connectivity paths between the two end points.

As an alternative option, the method includes generating the set of ECMP paths using ECMP multipoint paths. The multipoint paths include a set of connectivity multipoint paths among the same end points. As a further option, each ECMP path comprises an ECMP multipoint path having N endpoints. Each ECMP multipoint path may be identified using a Group address. As a further option, each ECMP multipoint path associated with the two end points may be identified using a Group MAC address. In this case, the Group MAC address is optionally constructed by applying an operation on Backbone Service Identifier values associated with the ECMP multipoint paths.

As an option, the method further includes monitoring an ECMP path by sending the monitored packet using the identifier associated with the specific path. Optional examples of such an identifier are a Flow Hash and a Group MAC address identifying the path.

As an alternative option, the method further includes monitoring a plurality of ECMP paths by sending monitored packets in groups cyclically on each monitored ECMP path, using the identifier associated with each monitored ECMP path.

According to a second aspect, there is provided a node for use in a communications network supporting ECMP. The node is provided with a processor for generating a set of ECMP path MAs for sending data between end points. The processor is further arranged to create a set of ECMP MAs for monitoring the generated ECMP paths between the endpoints. A transmitter is also provided for sending monitoring packets using the set of generated ECMP paths. An advantage of this is that ECMP paths MAs conform to existing CFM operations, and are compatible with both ECMP point to point path MAs and ECMP multipoint path MAs. The node is optionally implemented in any type of device that implements ECMP.

As an option, the node is provided with a computer readable medium in the form of a memory for storing information mapping at least one Service Identifier to each generated ECMP path.

The processor is optionally arranged to generate monitoring packets using ECMP Point to Point paths comprising a set of equal shortest length connectivity paths between the end points.

As an alternative option, the processor is arranged to generate monitoring packets using ECMP multipoint paths comprising a set of connectivity multipoint paths among a plurality of end points. As a further option, the processor is arranged to identify an ECMP multipoint path monitoring packet using a Group MAC address for each ECMP path. In this case, the processor is optionally arranged to construct each Group MAC address by applying an operation on Backbone Service Identifier values associated with the ECMP multipoint paths.

According to a third aspect, there is provided a computer program comprising computer readable code which, when run on a node, causes the node to perform the method as described above in the first aspect.

According to a fourth aspect, there is provided a computer program product comprising a non-transitory computer readable medium and a computer program described above in the third aspect, wherein the computer program is stored on the computer readable medium.

According to a fifth aspect, there is provided a vessel or vehicle comprising the node described above in the second aspect.

DETAILED DESCRIPTION

Figure 1:
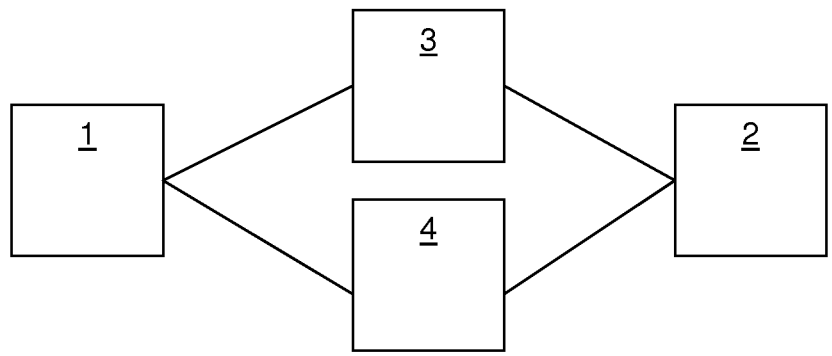
FIG. 1 illustrates schematically in a block diagram a network architecture showing the principles of Equal Cost Multiple Path routing.

A consistent way of enabling OAM monitoring for Connectivity Fault Management for both ECMP PtP path MAs and ECMP Multipoint path MAs is provided. "Fate sharing" is guaranteed by using the same forwarding parameters for monitoring packets such as CFM PDUs monitoring the ECMP service as for monitored data frames. In particular, the destination address of CFM PDUs associated with ECMP path MAs is the same address used to reach remote MEPs within the same MA, and is provided by the configuration of the MA itself. Each specific ECMP is identified by a Flow Hash value and any subsets of ECMP paths within the same PtP path are identified by the associated subset of Flow Hash values.

An ECMP path MA is associated with a connectivity path connecting a specific group of endpoints or with a subset (not necessarily proper) of equal cost paths connecting the same end points. In the latter case, the corresponding CFM PDUs are sent in groups cyclically on every monitored path, using an identifier associated with every monitored path. The number of CFM PDUs in every group depends on the specific CFM PDU: For example, for CCMs, at least four CCMs must be sent on a single monitored path before moving to the next one. For Loopback Messages (LBMs), as many LBMs as provided by the administrator that initiates the LBM are sent. Only one LTM need be sent. This is because CCMs are sent periodically, and a fault is only reported when more than three consecutive CCMs are in error (so we need to send at least four on the same path to be able to check it). The periodicity of LBMs (if any) is configurable and correspondingly the number of LBMs on individual paths must be based on the configuration setting. LTMs are set to identify individual nodes along the path, and so only one LTM on each individual path is required.

In the case of ECMP multipoint path services, the destination_address parameter of the associated monitoring CFM PDUs is set cyclically to the SPBM Group MAC address associated with the monitored multipoint service. SPBM Group MAC address assignment can be automated.

In more detail, two ECMP connectivity paths are defined as follows:

1. ECMP PtP path: This is the complete set of equal shortest length connectivity paths between two specific end points as constructed by ECMP. In addition to what is described in P802.1Qbp/1.0, LB and LT use the same cyclic methods when a subset of Flow Hash values is provided.
2. ECMP multipoint path: This is the complete set of connectivity multipoint paths among more than two end points as constructed by ECMP. A single multipoint path within an ECMP multipoint path of N endpoints is identified either by:
   (a). N Group MAC addresses constructed as follows: the first 3 bytes corresponding to the SPsourceID of the initiating Backbone Edge Bridge (BEB) and the last 3 bytes corresponding to the same I-SID identifying the N endpoint connectivity (this I-SID value may be automated to, for example, be the least backbone I-SID value on the set of I-SID values mapped to an ECMP-VID operation within the Backbone Service Instance table on the terminating BEBs having the least SPsourceID), that is: (SPsourceID[1]-ISID, SPsourceID[2]-ISID, . . . , SPsourceID[N]-ISID); or
   (b). A single Group MAC address for all endpoints constructed as follows: the first 3 bytes corresponding to the IEEE 802.1Q Backbone Service Instance Group address OUI (see clause 26.4 in IEEE Std 802.1Q-2011, VLAN aware Bridges) and the last three bytes corresponding to the same I-SID identifying the N endpoint connectivity (this I-SID value chosen could be automated to, for example, be the least backbone I-SID value on the set of I-SID values mapped to an ECMP-VID operation within the Backbone Service Instance table on the terminating BEBs having the least SPsourceID). That is the same group address that is used for all I-SID endpoints corresponding to the Backbone Service instance Group Address.

The choice between (a) and (b) type of addressing described above is made by configuration. Note that the selection of (a) or (b) depends on how the ECMP multipoint connectivity is set up. Option (a) requires the set up N individual MAC addresses for an N point connectivity, while option (b) requires a single MAC address for an N-point connectivity. Option (a) provides better coverage at the expense of increased complexity.

Other multipoint paths (up to 16 for each group, a or b) within the same ECMP multipoint connectivity associated with exactly the same N endpoints can be identified by using Group MAC addresses constructed by the above sets by x:oring the I-SID values in (a) or (b) type addressing using tie break masks described in 28.8 in IEEE Std 802.1aq-2012, Shortest Path Bridging.

In order to enable ECMP operation, an I-SID to path mapping table must be configured for all local I-SIDs that map to the B-VID indicating ECMP operation on the BEBs Backbone Service Instance table. Note that there may be a default configuration set to distribute I-SIDs equally to all ECMP paths. In this case, I-SIDs can be mapped in increasing order to paths. Table 1 below is an example of such a table:

TABLE 1

Exemplary mapping of I-SIDs to paths.

| | |
|---|---|
| $I\text{-}SID_1, I\text{-}SID_2, \ldots, I\text{-}SID_k$ | Path 1 |
| $I\text{-}SID_{k+1}, \ldots, I\text{-}SID_{k+m}$ | Path 2 |
| $I\text{-}SID_p, \ldots, I\text{-}SID_z$ | Path 16 |

For each subset of I-SID values that are mapped on the same path, the least $I\text{-}SID_{low}$ value is identified and all the subsets are ordered on increasing $I\text{-}SID_{low}$ values. The I-SID subsets are then mapped to multipoint paths identified by Group MAC addresses constructed as defined above and x:ored in accordance with IEEE std 802.1aq-2012 in increasing order. Table 2 illustrates an I-SID distribution table when addressing method (a) is used:

TABLE 2

Exemplary mapping of I-SIDs to paths

| | |
|---|---|
| 1000, 40000, 3443 | Path 1 |
| 999, 104000 | Path 2 |
| 39000, 1010 | Path 3 |
| 800000, 995 | Path 4 |

An exemplary automated constructed Group MAC for a node identified by SPSourceID 5 (having the appropriate multicast address bit set) is shown in Table 3.

TABLE 3

Exemplary automated constructed Group MAC

| | |
|---|---|
| 800000, 995 | 5-995 |
| 999, 104000 | 5-(995 x:ored 0x01) |
| 1000, 40000, 3443 | 5-(995 x:ored 0x02) |
| 39000, 1010 | 5-(995 x:ored 0x03) |

The method described above provides a way to automate the allocation of identifiers of individual paths within ECMP multipoint path connectivity.

The address used by CFM PDUs to reach remote MEPs within the same ECMP path MA is provided by the configuration of the MA itself. In the case of the ECMP multipoint path MAs it is an SPBM Group Address associated with the monitored service. The above method describes a way to automate the distribution of Group addresses based on the I-SID ECMP configuration tables. In the case of a single path with the ECMP path MA, the CFM PDUs use the MAC address associated with it. In cases where more then one path is monitored, the CFM PDUs are cyclically destined to the associated Group MAC addresses.

The associated ECMP path MEPs are placed on a Customer Backbone Port (CBP) by using the TESI multiplex entities and using the associated Group MAC address identifiers The techniques described above enable automated configuration of ECMP multipoint path MAs in a way that does not require alterations to existing CFM operations, and is compatible with ECMP PtP paths MAs.

Figure 2:
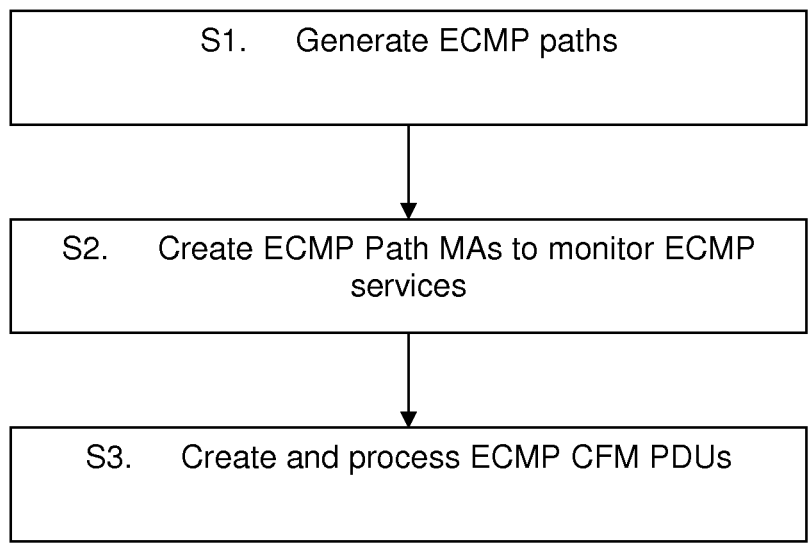
FIG. 2 is a flow diagram showing steps according to an embodiment.

Turning now to FIG. 2, there is shown a flow diagram showing steps of an exemplary embodiment. The following numbering corresponds to that of FIG. 2.

S1. ECMP multipoint paths are generated and are identified by a set of SPB Group Addresses as described above.

S2. ECMP PtP and multipoint path MAs are determined in order to monitor the ECMP paths. The ECMP path MAs can be associated with a connectivity path connecting a specific group of endpoints or with a subset (not necessarily proper) of equal cost paths connecting the same end points. Each ECMP PtP individual path is identified by a Flow Hash value, while each ECMP multipoint individual path is identified by an SPB Group Address as described above.

S3. CFM PDUs are sent and processed on those MAs determined in step S2. When multiple paths are used, the corresponding CFM PDUs are sent in groups cyclically on every monitored path, using the identifier associated with every monitored path. The number of CFM PDUs in every group depends on the specific CFM PDU. For example, for CCMs there should be sent at least 4 CCMs on a single monitored path before moving to the next one. For LBMs, as many LBMs as provided by the administrator that initiated the LBM are sent. For LTMs, only one LTM is sent.

As described above, there are various ways in which I-SID subsets that define paths can be mapped to Group MAC addresses.

Figure 3:
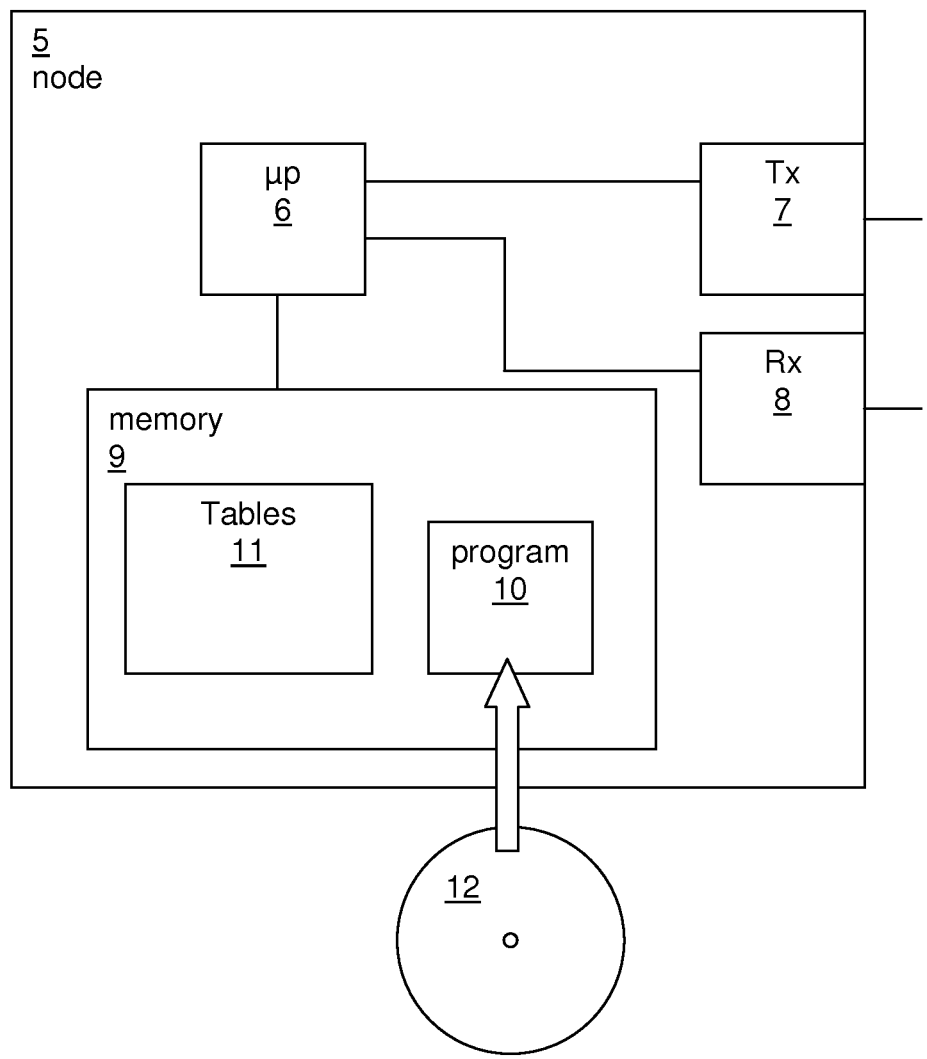
FIG. 3 illustrates schematically in a block diagram an exemplary node.

Turning now to FIG. 3, there is illustrated a node 5 for use in a communications network. Examples of implementations of the node 5 are any types of device that implement ECMP. This includes a VLAN aware bridge that implements IS-IS SPB and all the ECMP related functionality as described by P802.1Qbp. The node 5 may also be implemented in any device (virtual or physical), such as a router or a virtual machine, that implements the ECMP related functionality as described in P802.1Qbp.

The node 5 is provided with a processor 6 for generating the ECMP paths and applying them to data and CFM PDUs. A transmitter 7 and receiver 8 may also be provided. Note that this may be in the form of a separate transmitter and receiver or in the form of a transceiver. A non-transitory computer readable medium in the form of a memory 9 may be provided. This may be used to store a program 10 which, when executed by the processor 6, causes the node 5 to behave as described above. The memory 9 may also be used to store tables 11, such as Tables 1 to 3 described above for mapping I-SID values and Group MAC addresses to paths. Note that the memory 9 may be a single physical memory or may be distributed or connected remotely to the node 5. In the example of FIG. 2, the memory is shown as being located at the node 5.

Note also that the computer program 10 may be provided on a further non-transitory computer readable medium 12 such as a Compact Disk or flash drive and transferred from the further memory 12 to the memory 9 or executed by the processor 6 directly from the further memory 12.

A node such as a Bridge network node supporting ECMP can typically support a plurality of other service types (such as VLAN, Traffic Engineered services, Backbone tunnel services, etc). In an embodiment, the network is a Provider Backbone network where its edges (the endpoints described above) are Backbone Edge Bridges (which can encapsulate and decapsulate received frames) while transit Bridges are called Backbone Core Bridges which do not have encapsulation/decapsulation capabilities. The network needs to run Shortest Path Bridging in MAC mode (SPBM) which is used to create shortest paths between the edges. ECMP further updates SPBM in order to enable multiple paths among the same edges. A node performing ECMP typically has processing capabilities and requirements associated with the ECMP service monitoring. That is, ECMP MEPs need to be instantiated at the BEBs (in particular CBPs (Customer Backbone Ports within the BEBs) in order to initiate and process CFM PDUs associated with the ECMP services, and ECMP MIPs need to be instantiated at BCBs in order to process received CFM PDUs and respond.

Figure 4:
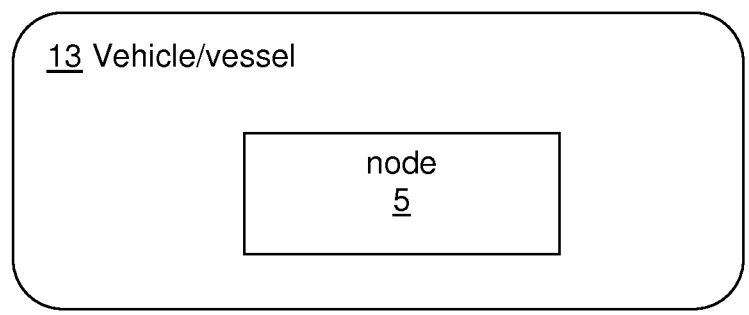
FIG. 4 illustrates schematically in a block diagram an exemplary vessel or vehicle.

Turning to FIG. 4 herein, there is illustrated a vessel or vehicle 13, examples of which include a ship, a train, a truck, a car, an aeroplane and so on. The vessel/vehicle 13 is provided with the node 5 described above.

It will be appreciated by the person of skill in the art that various modifications may be made to the above described embodiments. For example, the functions of the network node are described as being embodied at a single node, but it will be appreciated that different functions may be provided at different network nodes.

The following abbreviations have been used in this specification:
BEB Backbone Edge Bridge
B-VID Bridging VLAN Identifier
CBP Customer Backbone Port
CCM Continuity Check Message
CFM Connectivity Fault Management
ECMP Equal Cost Multiple Paths
FDB Filtering Database
IS-IS Intermediate System to Intermediate System
I-SID Backbone Service Identifier
LBM Loopback Message
LTM Link Trace Message
MA Maintenance Association
MEP Maintenance Association Edge Point
OAM Operations, Administration and Maintenance
PBB-TE Provider Backbone Bridges-Traffic Engineering
PDU Protocol Data Unit
PtP Point to point
SPB Shortest Path Bridging
SPBM Shortest Path Bridging-MAC address mode
TESI Traffic Engineered Service Instance
VID VLAN Identifier
VLAN Virtual LAN

The invention claimed is:

1. A method of monitoring a Maintenance Association for Connectivity Fault Management in a network supporting Equal Cost Multiple Paths, ECMP, the method comprising:
generating a set of ECMP multipoint paths for sending data between endpoints in the network, the ECMP multipoint paths comprising a set of connectivity multipoint paths along the same endpoints, each ECMP multipoint path of the set of ECMP multipoint paths having N endpoints and being identified using a Group address;
creating a set of ECMP Maintenance Associations for monitoring the generated ECMP multipoint paths between the endpoints; and
using the created set of ECMP Maintenance Associations for sending monitoring packets.

2. The method according to claim 1, wherein each monitoring packet comprises a Connectivity Fault Management Protocol Data Unit.

3. The method according to claim 1, wherein the Group address is a Group MAC address.

4. The method according to claim 3, further comprising constructing the Group MAC address by applying an operation on Backbone Service Identifier values associated with the ECMP multipoint paths.

5. The method according to claim 4, further comprising monitoring one or more of the ECMP multipoint paths by sending the monitored packet using the Backbone Service Identifier value associated with the one or more monitored ECMP multipoint paths.

6. The method according to claim 5, wherein the identifier is selected from any of a Flow Hash and a Group MAC address identifying the path.

7. The method according to claim 1, further comprising monitoring a plurality of ECMP multipoint paths by sending monitored packets in groups cyclically on each monitored ECMP multipoint path, using the identifier associated with each monitored ECMP path.

8. A non-transitory computer readable medium which, when run on a node, causes the node to perform the method of claim 1.

9. A node for use in a communications network supporting Equal Cost Multiple Paths, ECMP, the node comprising:
- a processor for generating a set of ECMP multipoint path for sending data between end points, the ECMP multipoint paths comprising a set of connectivity multipoint paths along the same endpoints, each ECMP multipoint path of the set of ECMP multipoint paths having N endpoints and being identified using a Group address;
- the processor being further arranged to create a set of ECMP Maintenance Associations for monitoring the generated ECMP multipoint paths between the endpoints; and
- a transmitter for sending monitoring packets using the set of generated ECMP multipoint paths.

10. The node according to claim 9, wherein the processor is arranged to identify an ECMP multipoint path monitoring packet using a Group MAC address for each multipoint ECMP path.

11. The node according to claim 10, wherein the processor is arranged to construct each Group MAC address by applying an operation on Backbone Service Identifier values associated with the ECMP multipoint paths.

12. A vessel or vehicle comprising the node as claimed in claim 9.

13. A node for use in a communications network supporting Equal Cost Multiple Paths, ECMP, the node comprising:
- a processor for generating a set of ECMP multipoint path for sending data between end points, the ECMP multipoint paths comprising a set of connectivity multipoint paths along the same endpoints, each ECMP multipoint path of the set of ECMP multipoint paths comprising an ECMP multipoint path having N endpoints and being identified using a Group address;
- the processor being further arranged to create a set of ECMP Maintenance Associations for monitoring the generated ECMP multipoint paths between the endpoints;
- a transmitter for sending monitoring packets using the set of generated ECMP multipoint paths; and
- a computer readable medium in the form of a memory for storing information mapping at least one Service Identifier to each generated ECMP multipoint path.

* * * * *

UNITED STATES PATENT AND TRADEMARK OFFICE
CERTIFICATE OF CORRECTION

PATENT NO.       : 9,571,364 B2
APPLICATION NO.  : 14/414338
DATED            : February 14, 2017
INVENTOR(S)      : Saltsidis It is certified that error appears in the above-identified patent and that said Letters Patent is hereby corrected as shown below:

On the Title Page

In item (56), under "U.S. PATENT DOCUMENTS", in Column 2, Line 1, delete "Balasubramanian" and insert -- Balasubramanian et al. --, therefor.

In item (56), under "U.S. PATENT DOCUMENTS", in Column 2, Line 3, delete "Cooper" and insert -- Cooper et al. --, therefor.

On Page 2, in item (56), under "U.S. PATENT DOCUMENTS", in Column 1, Line 1, delete "Matthews" and insert -- Matthews et al. --, therefor.

On Page 2, in item (56), under "U.S. PATENT DOCUMENTS", in Column 1, Line 3, delete "Mishra" and insert -- Mishra et al. --, therefor.

On Page 2, in item (56), under "U.S. PATENT DOCUMENTS", in Column 2, Line 1, delete "Mishra" and insert -- Mishra et al. --, therefor.

On Page 2, in item (56), under "U.S. PATENT DOCUMENTS", in Column 2, Line 3, delete "Anderson" and insert -- Anderson et al. --, therefor.

On Page 2, in item (56), under "U.S. PATENT DOCUMENTS", in Column 2, Line 5, delete "Cai" and insert -- Cai et al. --, therefor.

In the Specification

In Column 1, Line 31, delete "Association Edge" and insert -- Edge --, therefor.

In Column 2, Line 16, delete "address mode" and insert -- mode --, therefor.

Signed and Sealed this
Twenty-third Day of May, 2017

Michelle K. Lee
*Director of the United States Patent and Trademark Office*

CERTIFICATE OF CORRECTION (continued)
U.S. Pat. No. 9,571,364 B2

In Column 2, Line 55, delete "Service" and insert -- Service Instance --, therefor.

In Column 2, Line 64, delete "Association Edge" and insert -- Edge --, therefor.

In Column 4, Line 32, delete "routing:" and insert -- routing; --, therefor.

In Column 8, Line 6, delete "BCBs" and insert -- BEBs --, therefor.

In Column 8, Line 28, delete "Identifier" and insert -- Instance Identifier --, therefor.

In Column 8, Line 32, delete "Association Edge" and insert -- Edge --, therefor.

In Column 8, Line 38, delete "address mode" and insert -- mode --, therefor.